United States Patent
Liao

(10) Patent No.: US 11,112,067 B1
(45) Date of Patent: Sep. 7, 2021

(54) LED LIGHT TUBE APPARATUS

(71) Applicant: XIAMEN LEEDARSON LIGHTING CO.LTD., Fujian (CN)

(72) Inventor: Qingyue Liao, Fujian (CN)

(73) Assignee: XIAMEN LEEDARSON LIGHTING CO, LTD, Fujian (CN)

( * ) Notice: Subject to any disclaimer, the term of this patent is extended or adjusted under 35 U.S.C. 154(b) by 0 days.

(21) Appl. No.: 16/916,113

(22) Filed: Jun. 30, 2020

(51) Int. Cl.
*F21K 9/272* (2016.01)
*F21K 9/278* (2016.01)
*H05B 45/30* (2020.01)
*F21S 4/28* (2016.01)
*F21Y 115/10* (2016.01)
*F21Y 103/10* (2016.01)

(52) U.S. Cl.
CPC ............. *F21K 9/272* (2016.08); *F21K 9/278* (2016.08); *F21S 4/28* (2016.01); *H05B 45/30* (2020.01); *F21Y 2103/10* (2016.08); *F21Y 2115/10* (2016.08)

(58) Field of Classification Search
CPC .......... F21K 9/272; F21K 9/278; F21K 9/275; H05B 45/30; F21S 4/28; F21Y 2115/10; F21Y 2103/10; F21L 4/00; F21V 23/0464; F21V 23/0471; F21V 21/096; F21V 21/0965; F21V 21/30; F21V 14/02
See application file for complete search history.

(56) References Cited

U.S. PATENT DOCUMENTS

| | | | | |
|---|---|---|---|---|
| 7,052,171 | B1* | 5/2006 | Lefebvre | F21K 9/27 362/649 |
| 7,311,423 | B2* | 12/2007 | Frecska | F21V 14/02 362/372 |
| 9,046,256 | B2* | 6/2015 | Szprengiel | F21V 23/06 |
| 9,644,828 | B1* | 5/2017 | May | H01R 33/94 |
| 9,752,735 | B2* | 9/2017 | Chamberlain | F21V 3/02 |
| 10,334,684 | B2* | 6/2019 | Polychronakis | H05B 47/19 |
| 10,624,160 | B2* | 4/2020 | Jiang | F21V 23/023 |
| 10,738,971 | B2* | 8/2020 | Van Winkle | F21S 8/03 |

* cited by examiner

*Primary Examiner* — Peggy A Neils
(74) *Attorney, Agent, or Firm* — Chun-Ming Shih; Lanway IPR Services

(57) ABSTRACT

A LED light tube includes a LED strip having a substrate plate and multiple LED modules. A light passing tube with a main portion, a first end portion and a second end portion. The first end portion and the second end portion are placed at two opposite ends of the main portion. A first end cap is attached to the first end portion and a second end cap is attached to a second end portion of the light passing tube. An exterior surface of the main portion has defined a peripheral edge line. The first end portion has a tilt curve portion with a tilt angle between the peripheral edge line and an exterior surface of the first end portion.

18 Claims, 7 Drawing Sheets

LED LIGHT TUBE APPARATUS

FIELD

The present invention is related to a lighting apparatus and more particularly related to a LED light tube.

BACKGROUND

Light emitting diode (LED) lighting technology is rapidly developing to replace traditional incandescent and fluorescent lighting. LED tube lamps are mercury free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs and fluorescent tube lights. Benefits of LED lights include improved durability and longevity and far less energy consumption.

Lighting or illumination is the deliberate use of light to achieve a practical or aesthetic effect. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants.

Large scale lighting systems for business, industrial operations, educational institutions or hospitals have traditionally used fluorescent light fixtures with replaceable fluorescent light tubes. These fluorescent tubes are increasingly being replaced with light emitting diode (LED) light tubes.

When the LED technology keeps advancing, more types of LED light devices are developed and designed. There is always a strong need to find a convenient, low cost and flexible light apparatus for improving human life.

SUMMARY

Lighting or illumination is the deliberate use of light to achieve a practical or aesthetic effect. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants. Although lighting devices are widely used, there are still lots of opportunity and benefit to improve the lighting devices to provide more convenient, low cost, reliable and beautiful lighting devices for enhancing human life.

A LED tube is usually produced using a large number of low or medium-power LEDs. With the help of using a large number or low or medium-power LEDs, light output and heat conduction are balanced out across the entire tube length. The operating temperature of the LED tube is lower as compared to traditional lighting technologies, and a LED tube produces less heat than traditional fluorescent lamps. A LED tube may be used for general purposes at all locations, with the exception of location where both upwards and downwards lighting is required. These include office luminaires suspended from the ceiling and emitting light upwards and downwards.

A LED light tube may include a LED strip having a substrate plate and multiple LED modules. The multiple LED modules are mounted on the substrate plate. A light passing tube with a main portion, a first end portion and a second end portion. The first end portion and the second end portion are placed at two opposite ends of the main portion. The light passing tube is used for storing the LED strip. A first end cap attached to the first end portion of the light passing tube. An exterior surface of the main portion has defined a peripheral edge line. The first end portion has a tilt curve portion with a tilt angle between the peripheral edge line and an exterior surface of the first end portion. The tilt angle is between three degrees to ten degrees. A second end cap attached to a second end portion of the light passing tube. The first end cap and the second end cap each having two pins. A driver enclosing in one of the end caps for supplying a driving current to the multiple LED modules and for controlling the multiple LED modules.

In an embodiment, the LED light tube has a tilt curve portion. The tilt curve portion has a low section and a high section. The low section is adjacent to the main portion of the light passing tube. The high section is adjacent to the first end cap. A slope rate of the low section is smaller than the high section.

In an embodiment, the LED light tube has a tilt curve portion. The tilt curve portion has a first part connected to the first end cap, a middle part and a second part connected to the main portion of the light passing tube, the first part and the second part have larger diameters than the middle part.

In an embodiment, the LED light tube has a tilt curve portion. The tilt curve portion has a first part, a middle part and a second part. The first part is connected to the first end cap. The middle part and the second part are connected to the main portion of the light passing tube. The first part and the second part have smaller diameters than the middle part.

In an embodiment, the LED light tube has a tilt curve portion. The tilt curve portion has a first part, a middle part and a second part. The first part is connected to the first end cap. The middle part and the second part is connected to the main portion of the light passing tube. Diameters of the first part, the middle part and the second part are changed gradually.

In an embodiment, the LED light tube has the first end cap attached to the first end portion of the light passing tube. The first end cap has an extended electrode for connecting to an attached device for providing an external power to the attached device. The attached device may be as an augmented module providing one or more function for a light.

In an embodiment, the attached device is detachable from the first end cap to be replaced with another attached device. Another attached device provides a different function as the attached device. Several types of attached device may each have different functions. The attached device may be an emergency device, a backup battery, or a radio player, etc. Users may replace the attached device they want or need by using the same light tube body and lighting base without changing the whole lighting structure. In an embodiment, another attached device and the attached device are operated under different wireless protocols. The wireless protocols may be such as Bluetooth or WIFI.

In an embodiment, the LED light tube has an attached device. The attached device has a sensor for collecting an environment information outside the LED light tube. The driver operates according to the environment information. The sensor may send different message according the weather, the temperature, the day or the night, to turn the light brighter or darker.

In an embodiment, the sensor detects an ambient light level. The driver adjusts an output light of the LED strip according to the ambient light level. The sensor may detect a luminosity of the environment, sending a control signal through a resistor and a voltage to a drive, and the driver may change the current to send to the LED strip. In an embodiment, the illumination of the light may change brighter or darker according to the time, the sensor may give a message to the light to turn brighter in the morning and turn darker in the night. In an embodiment, the sensor may also give a message to the light to turn off when there is enough sunlight and turn on when the day gets dark.

In an embodiment, the sensor detects a movement of an object, and the driver controls the light strip based on whether the movement exists. For example, the sensor may detect the movement of a human, the light may be turn on when the human comes near and then turn off when the human goes far.

In an embodiment, the attached device has a battery providing a battery power to the driver to drive the LED strip. The battery may provide the battery power for the light to light when a current suddenly being cut off, such as an emergency device. The light turns up using the battery power to light when earthquake or typhoon that caused power cut.

In an embodiment, the battery provides the driver to drive the LED strip to emit light when the LED light tube apparatus is removed from a normal bracket holder. The light tube may be taken anywhere without wire and a power socket to transmit current such as a flashlight.

In an embodiment, an output light level of the LED strip is determined by an expected use time period. The output light level may be determined by a user to set up a schedule for the lighting time or the illumination.

In an embodiment, the attached device has a rotating ring wrapping the LED light tube apparatus, and rotatable manually relative to the LED light tube.

In an embodiment, a rotation angle of the rotating ring is provided to the driver to determine how to control the LED strip. In an embodiment, the rotating angle is 45 degrees, the driver controls the LED strip to make the light irradiate in a 45 degrees angle.

In an embodiment, the multiple LED modules of the LED strip has a first set and a second set of LED modules with different optical characteristics. The driver adjusts a relative driving current ratio to the first set of LED modules and the second set of LED modules to generate mixed output lights of different optical characteristics. The LED strip may be changed into different color temperature, changing different light colors.

In an embodiment, the LED strip emits a light beam with a main direction. A rotating angle of the rotating ring controls the driver to change the main direction of the light beam. The main direction of the light beam may turn left or right when the rotating ring rotated to the left or to the right by a user.

In an embodiment, the rotating ring moves the LED strip to change the main direction of the light beam. Generally, we use the narrower 45 degrees angle for smaller lights and 90 degrees for more powerful grow lights. This means that 45 degrees angle light have a less illuminated surface at the same distance as 90 degrees angle light but can still produce a good effect with the light even though the watt number is lower as there is a higher concentration of light. The combination of 45 degrees and 90 degrees light angle may also be used in lights. Mounting a 45 degrees angle light at a meter distance from the floor gives a lit area of about 500 cm while a 90 degrees angle light at the same distance emits a lit area of approximately 1000 cm.

In an embodiment, the attached device uses a magnet unit to attach to the first end cap. The magnet unit may be on an edge of the attached device to connect to an edge of the first end cap. The magnet unit may also be in the middle of the attached device to connect to a middle of the first end cap. A magnetic attraction of the magnet unit is strong enough to support one and more attached device to interlock the attached devices onto the first end cap.

DETAILED DESCRIPTION

Figure 1:
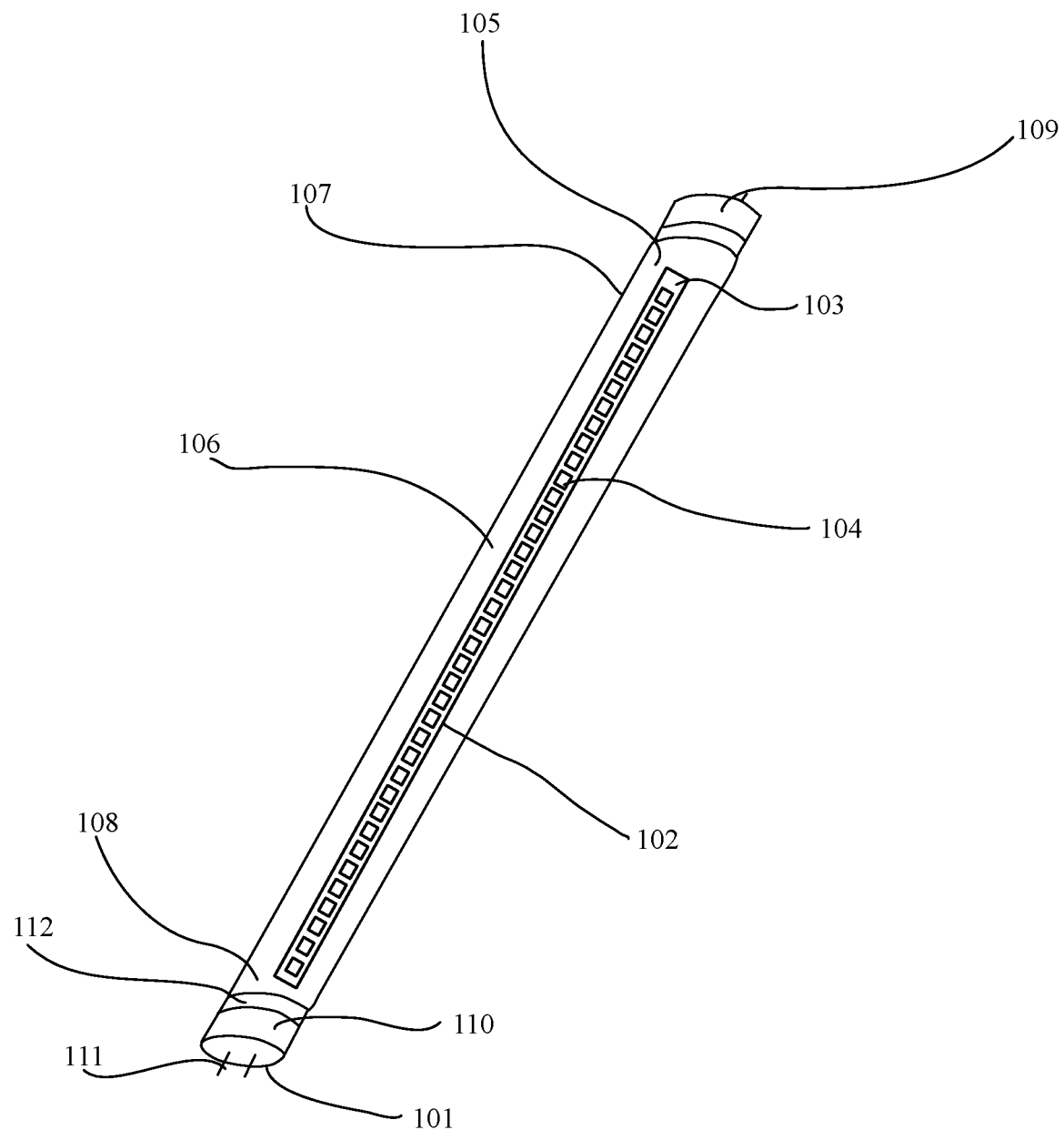
FIG. 1 is a perspective view of an LED light tube according to an embodiment of the present disclosure.

The embodiments described herein may be described referring to plane views or cross-sectional views by way of ideal schematic views. Accordingly, the exemplary views may be modified depending on manufacturing technologies or tolerances. Therefore, the disclosed embodiments are not limited to those shown in views but include modifications in configuration formed on the basis of manufacturing processes. Therefore, regions exemplified in figures may have schematic properties, and shapes of regions shown in figures may exemplify specific shapes of regions of elements to which aspects of the disclosure are not limit.

In the following description, the same reference numerals, although placed among different drawings, refer to the same components, and are not described again for brevity.

FIG. 1 is a perspective view of an LED light tube according to an embodiment of the present disclosure. FIG. 1 illustrates a LED light tube 101. The LED light tube 101 includes a LED strip 102, a light passing tube 105, a first end cap 109, a second end cap 110, and a driver 112.

Referring to FIG. 1, the LED light tube 101 includes the LED strip 102. The LED strip has a substrate plate 103 and multiple LED modules 104. The multiple LED modules 104 are mounted on the substrate plate 103. A light passing tube 105 has a main portion 106, a first end portion 107 and a second end portion 108. The first end portion 107 and the second end portion 108 are placed at two opposite ends of the main portion 106. The light passing tube 105 is used for storing the LED strip 102. A first end cap 109 attached to the first end portion 107 of the light passing tube 105.

Figure 2:
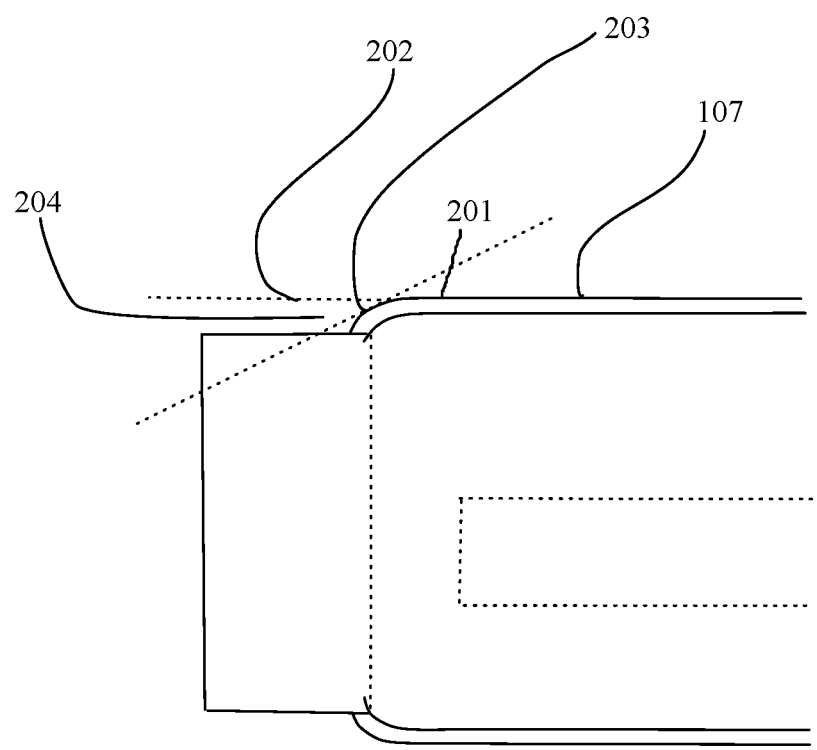
FIG. 2 is a side perspective partial view of a light tube of the LED light tube according to an embodiment of the present disclosure.

FIG. 2 is a side perspective partial view of a light tube of the LED light tube of the present disclosure. FIG. 2 illustrates an exterior face 201, a peripheral edge line 202, a tilt curve portion 203, and a tilt angle 204.

Referring to FIG. 1 and FIG. 2, the exterior surface 201 of the main portion 106 has defined a peripheral edge line 202. The first end portion 107 has a tilt curve portion 203 with a tilt angle 204 between the peripheral edge line 202 and an exterior surface 201 of the first end portion 107. The tilt angle 204 is between three degrees to ten degrees. A second end cap 110 attached to a second end portion 108 of the light passing tube 105. The first end cap 109 and the second end cap 110 each having two pins 111. A driver 112 enclosing in one of the end caps for supplying a driving current to the multiple LED modules 104 and for controlling the multiple LED modules 104.

Figure 3:
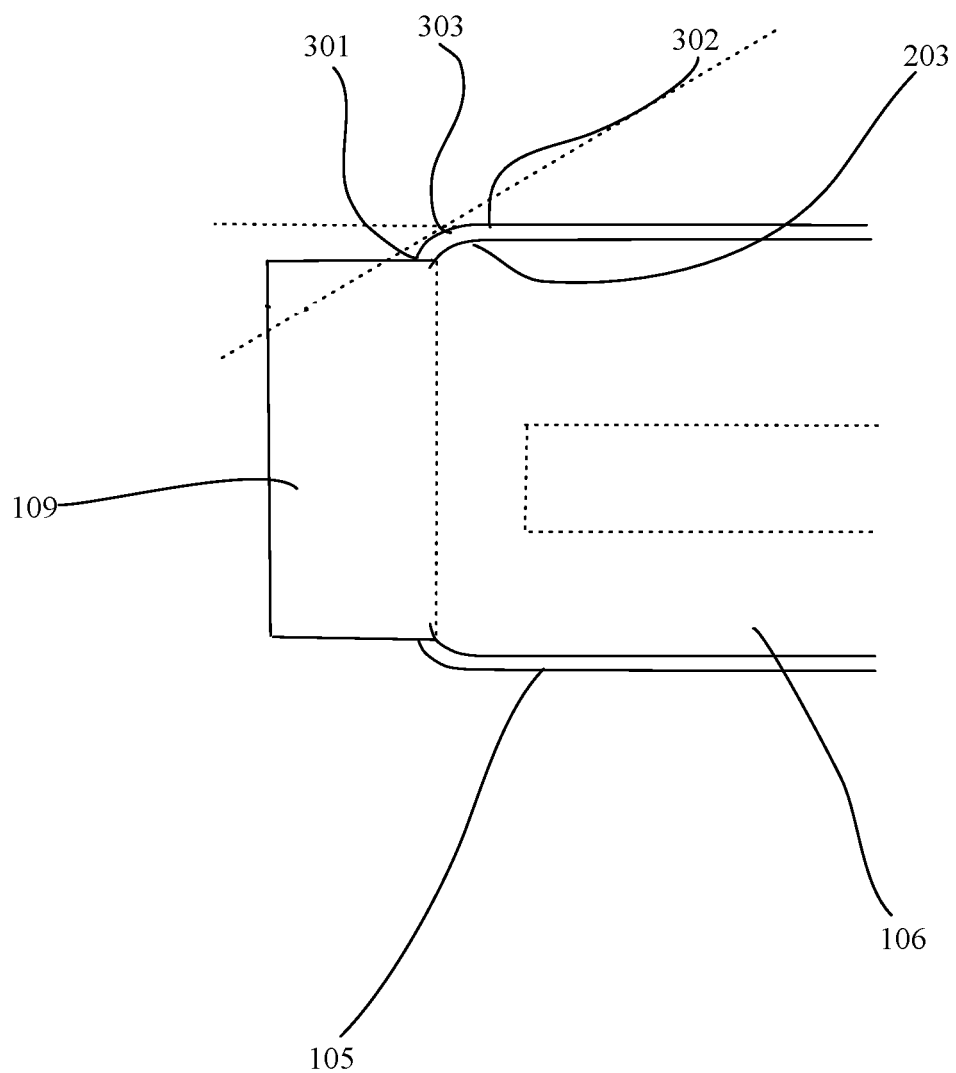
FIG. 3 is a side perspective partial view of a light tube of the LED light tube according to an embodiment of the present disclosure.

FIG. 3 is a side perspective partial view of a light tube of the LED light tube according to an embodiment of the present disclosure. FIG. 3 illustrates a tilt curve portion 203, a low section 301, a high section 302 and a slope rate 303.

Referring to FIG. 3, the LED light tube has a tilt curve portion 203. The tilt curve portion 203 has a low section 301 and a high section 302. The low section 301 is adjacent to the main portion 106 of the light passing tube 105. The high section 302 is adjacent to the first end cap 109. A slope rate 303 of the low section 301 is smaller than the high section 302.

Figure 4A:
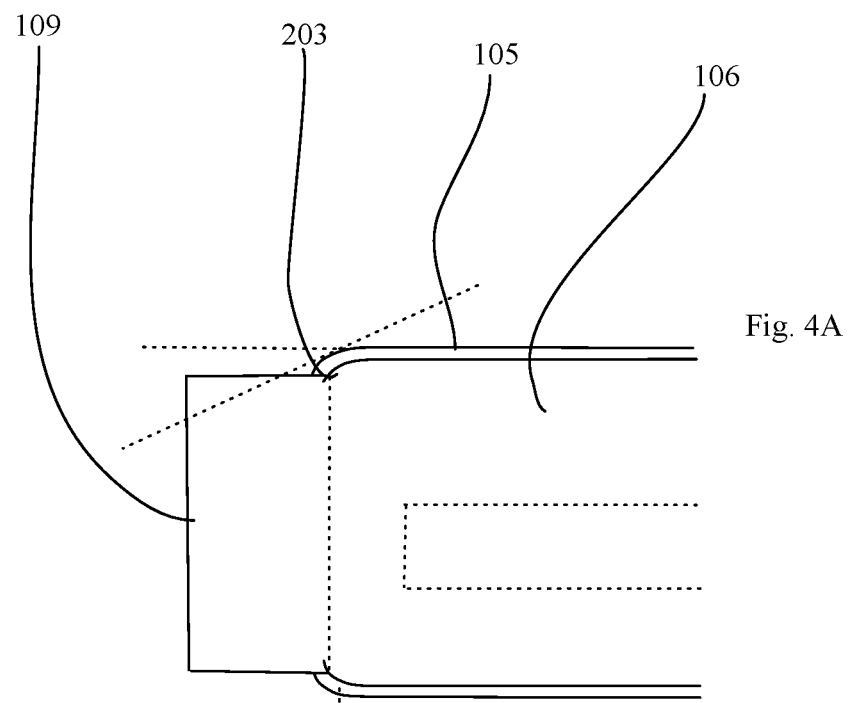
FIG. 4A is a side perspective partial view of a light tube of the LED light tube according to an embodiment of the present disclosure.
Figure 4B:
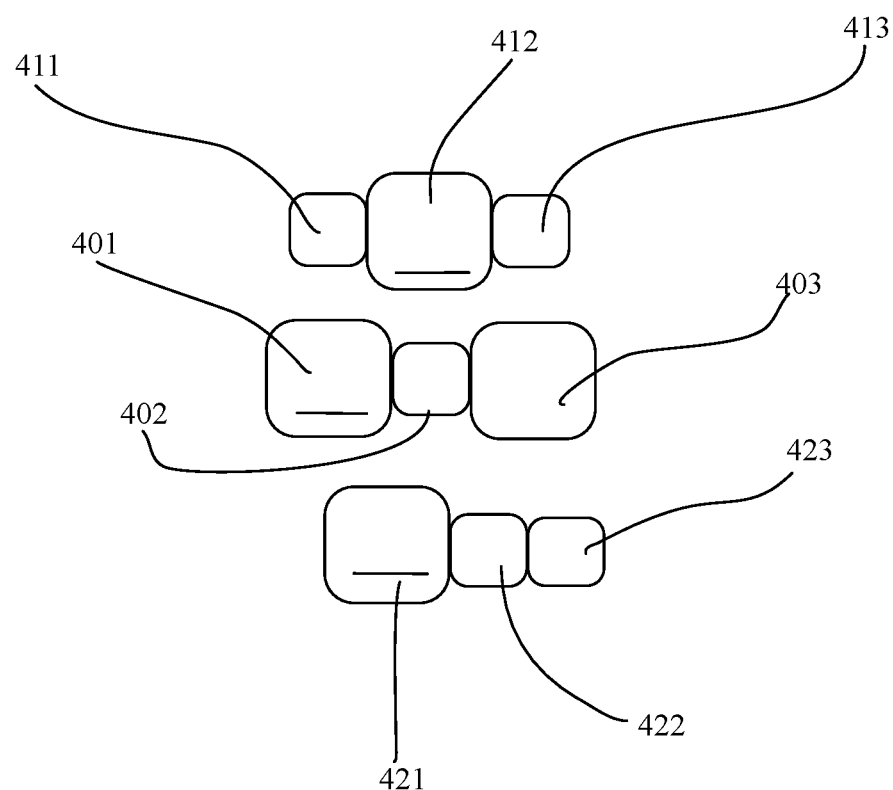
FIG. 4B is a diagram showing several embodiments of a tilt curve.

FIG. 4A is a side perspective partial view of a light tube of the LED light tube according to an embodiment of the present disclosure. FIG. 4B is a diagram showing several embodiments of a tilt curve portion.

Referring to FIG. 4A and FIG. 4B, the LED light tube has a tilt curve portion 203. The tilt curve portion 203 has a first part 401 connected to the first end cap 109, a middle part 402 and a second part 403 connected to the main portion 106 of the light passing tube 105, the first part 401 and the second part 403 have larger diameters than the middle part 402.

Referring to FIG. 4A and FIG. 4B, the LED light tube has the tilt curve portion 203. The tilt curve portion 203 has a first part 411, a middle part 412 and a second part 413. The first part 411 is connected to the first end cap 109. The middle part 412 and the second part 413 are connected to the main portion 106 of the light passing tube 105. The first part 411 and the second part 413 have smaller diameters than the middle part 412.

Referring to FIGS. 4A and 4B, the LED light tube has the tilt curve portion 203. The tilt curve portion 203 has a first part 421, a middle part 422 and a second part 423. The first part 421 is connected to the first end cap 109. The middle part 422 and the second part 423 are connected to the main portion 106 of the light passing tube 105. Diameters of the first part 421, the middle part 422 and the second part 423 are changed gradually.

Figure 5:
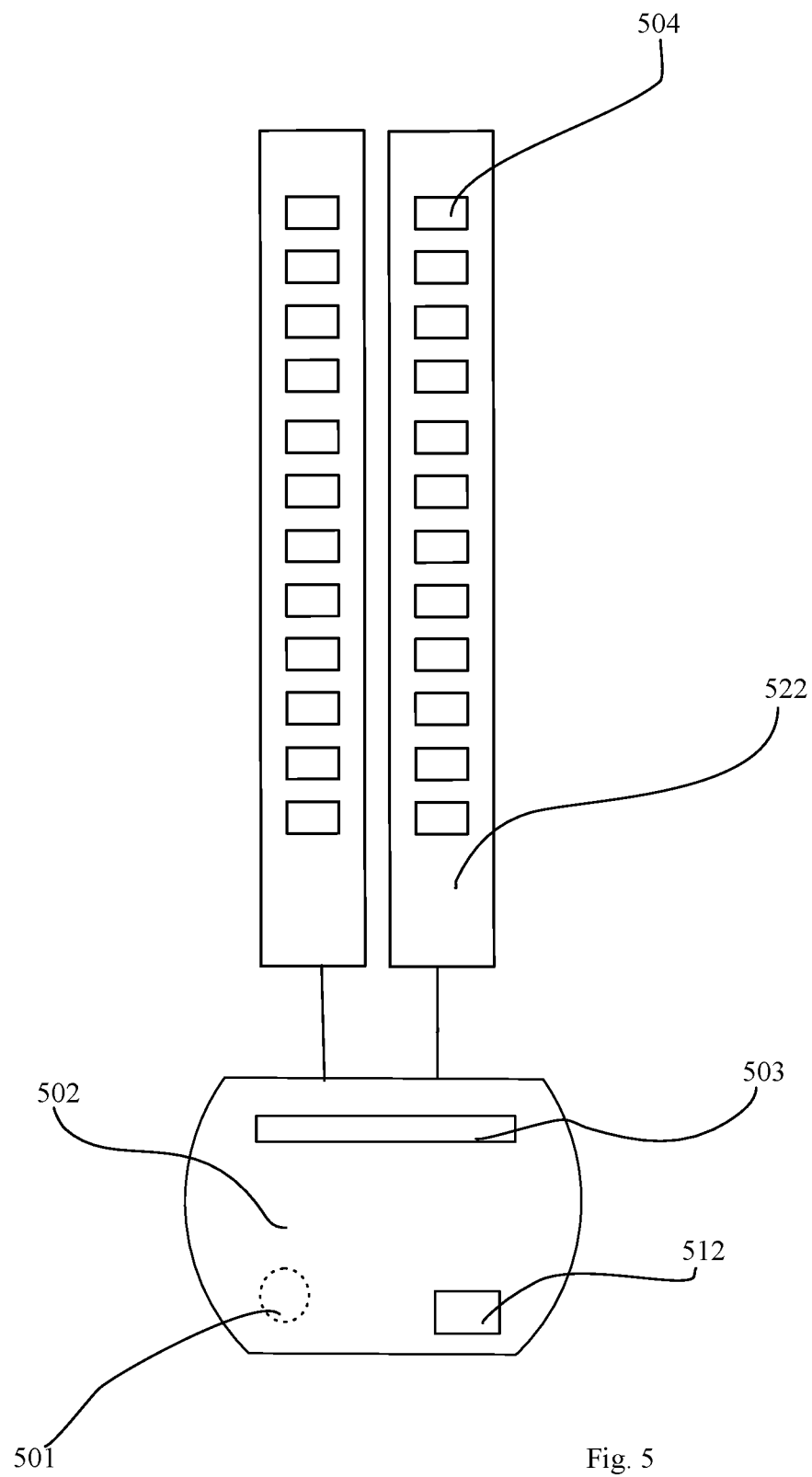
FIG. 5 is a schematic partial view of a light tube of the LED light tube according to an embodiment of the present disclosure.

FIG. 5 is a schematic partial view of a light tube of the LED light tube according to an embodiment of the present disclosure. FIG. 5 illustrates an extended electrode 501, an attached device 502, and a sensor 503.

Referring to FIG. 5, the LED light tube has the first end cap attached to the first end portion of the light passing tube. The first end cap has an extended electrode 501 for connecting to the attached device 502 for providing an external power to the attached device 502. The attached device 502 may be as an augmented module providing one or more function for a light.

In an embodiment, the attached device 502 is detachable from the first end cap to be replaced with another attached device. Another attached device provides a different function as the attached device 502. Several types of attached device may each have different functions. The attached device 502 may be an emergency device, a backup battery, or a radio player, etc. Users may replace the attached device 502 they want or need by using the same light tube body and lighting base without changing the whole lighting structure. In an embodiment, another attached device and the attached device 502 are operated under different wireless protocols. The wireless protocols may be such as Bluetooth or WIFI.

In an embodiment, the LED light tube has an attached device 502. The attached device 502 has a sensor 503 for collecting an environment information outside the LED light tube. The driver operates according to the environment information. The sensor 503 may send different message according the weather, the temperature, the day or the night, to turn the light brighter or darker.

In an embodiment, the sensor 503 detects an ambient light level. The driver 512 adjusts an output light of the LED strip 522 according to the ambient light level. The sensor 503 may detect a luminosity of the environment, sending a control signal through a resistor and a voltage to the driver 512, and the driver 512 may change the current to send to the LED strip 522. In an embodiment, the illumination of the light may change brighter or darker according to the time, the sensor 503 may give a message to the light to turn brighter in the morning and turn darker in the night. In an embodiment, the sensor 503 may also give a message to the light to turn off when there is enough sunlight and turn on when the day gets dark.

In an embodiment, the sensor 503 detects a movement of an object, and the driver 512 controls the light strip 522 based on whether the movement exists. For example, the sensor 503 may detect the movement of a human, the light may be turn on when the human comes near and then turn off when the human goes far.

Figure 6:
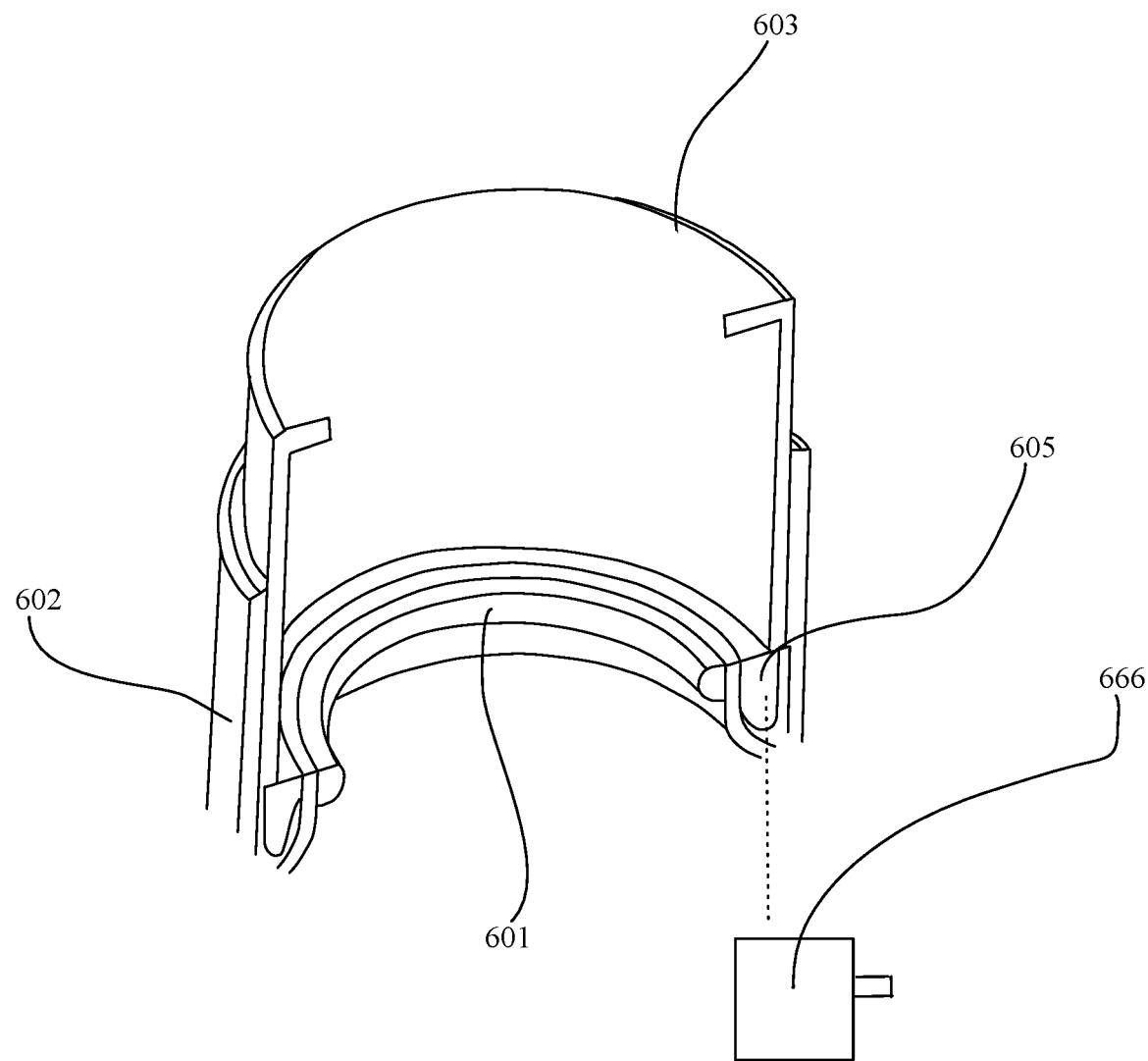
FIG. 6 is a schematic partial view of a light tube of the LED light tube according to an embodiment of the present disclosure.

FIG. 6 is a schematic partial view of a light tube of the LED light tube according to an embodiment of the present disclosure. FIG. 6 illustrates a rotating ring 601 with a rotating angle 605 and a battery 666.

Referring to FIG. 6, the attached device 602 has a battery 666 providing a battery power to the driver to drive the LED strip. The battery 666 may provide the battery power for the light to light when a current suddenly being cut off, such as an emergency device. The light turns up using the battery power to light when earthquake or typhoon that caused power cut.

In an embodiment, the battery 666 provides the driver to drive the LED strip to emit light when a LED light tube apparatus 603 apparatus is removed from a normal bracket holder. The light tube apparatus 603 may be taken anywhere without wire and a power socket to transmit current such as a flashlight.

In an embodiment, an output light level of the LED strip is determined by an expected use time period. The output light level may be determined by a user to set up a schedule for the lighting time or the illumination of the light.

Referring to FIG. 6, the attached device 602 has a rotating ring 601 wrapping the LED light tube apparatus 603, and rotatable manually relative to the LED light tube 603.

In an embodiment, a rotation angle 605 of the rotating ring 601 is provided to the driver to determine how to control the LED strip. In an embodiment, the rotating angle 605 is forty-five degrees, the driver controls the LED strip to make the light irradiate in a forty-five degrees angle.

Figure 7:
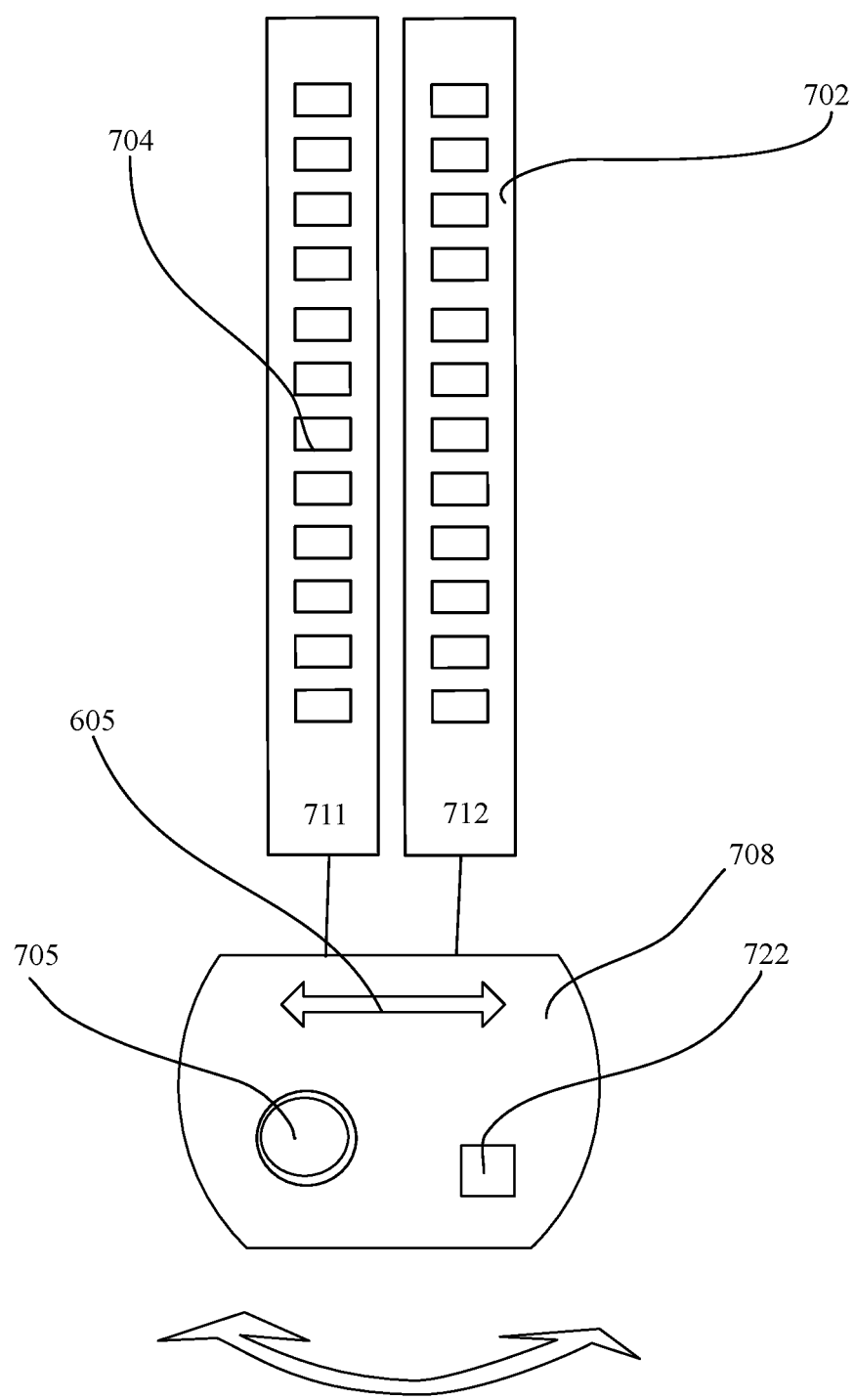
FIG. 7 is a schematic partial view of a light tube of the LED light tube according to an embodiment of the present disclosure.

FIG. 7 is a schematic partial view of a light tube of the LED light tube according to an embodiment of the present disclosure. FIG. 7 illustrates a LED strip 702 with multiple LED modules 704 which has a first set 711 and a second set 712, and a magnet unit 705 for connecting a attached device 708 and a first end cap.

Referring to FIG. 6 and FIG. 7, the multiple LED modules 704 of the LED strip 702 has a first set 711 and a second set 712 of the multiple LED modules 704 with different optical characteristics. The driver 722 adjusts a relative driving current ratio to the first set 711 of the multiple LED modules 704 and the second set of the multiple LED modules 704 to generate mixed output lights of different optical characteristics. The LED strip 702 may be changed into different color temperature, changing different light colors.

In an embodiment, the LED strip 702 emits a light beam with a main direction. A rotating angle 605 of the rotating ring 601 controls the driver 722 to change the main direction of the light beam. The main direction of the light beam may turn left or right when the rotating ring rotated to the left or to the right by a user.

In an embodiment, the rotating ring 601 moves the LED strip 702 to change the main direction of the light beam. Generally, we use the narrower forty-five degrees angle for smaller lights and ninety degrees for more powerful grow lights. This means that forty-five degrees angle light have a less illuminated surface at the same distance as ninety degrees angle light but can still produce a good effect with the light even though the watt number is lower as there is a higher concentration of light. The combination of forty-five degrees and ninety degrees light angle may also be used in lights. Mounting a forty-five degrees angle light at a meter distance from the floor gives a lit area of about fifty cm while a ninety degrees angle light at the same distance emits a lit area of approximately a hundred cm.

Referring to FIG. 7, the attached device 708 uses a magnet unit 705 to attach to the first end cap. The magnet unit 705 may be on an edge of the attached device 708 to connect to an edge of the first end cap. The magnet unit 705 may also be in the middle of the attached device 708 to connect to a middle of the first end cap. A magnetic force of the magnet unit 705 is strong enough to support one and more attached device 708 to interlock the attached devices 708 onto the first end cap.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. An LED light tube, comprising:
an LED strip having a substrate plate and multiple LED modules, the multiple LED modules being mounted on the substrate plate;
a light passing tube, having a main portion, a first end portion and a second end portion, the first end portion and the second end portion being placed at two opposite ends of the main portion, the light passing tube being used for storing the LED strip;
a first end cap attached to the first end portion of the light passing tube, an exterior surface of the main portion defining a peripheral edge line, the first end portion having a tilt curve portion with a tilt angle between the peripheral edge line and an exterior surface of the first end portion, the tilt angle being between three degrees to ten degrees;
a second end cap attached to a second end portion of the light passing tube, the first end cap and the second end cap each having two pins; and
a driver enclosing in one of the end caps for supplying a driving current to the multiple LED modules and for controlling the multiple LED modules, wherein the first end cap has an extended electrode for connecting to an attached device for providing an external power to the attached device, wherein the attached device is detachable from the first end cap to be replaced with an another attached device, the another attached device provides a different function as the attached device.

2. The LED light tube of claim 1, wherein the tilt curve portion has a low section and a high section, the low section is adjacent to the main portion of the light passing tube, the high section is adjacent to the first end cap, a slope rate of the low section is smaller than the high section.

3. The LED light tube of claim 1, wherein the tilt curve portion has a first part connected to the first end cap, a middle part and a second part connected to the main portion of the light passing tube, the first part and the second part have larger diameters than the middle part.

4. The LED light tube of claim 3, wherein the tilt curve portion has a first part connected to the first end cap, a middle part and a second part connected to the main portion of the light passing tube, the first part and the second part have smaller diameters than the middle part.

5. The LED light tube of claim 3, wherein the tilt curve portion has a first part connected to the first end cap, a middle part and a second part connected to the main portion of the light passing tube, diameters of the first part, the middle part and the second part are changed gradually.

6. The LED light tube of claim 1, wherein the another attached device and the attached device are operated under different wireless protocols.

7. The LED light tube of claim 1, wherein the attached device has a sensor for collecting an environment information outside the LED light tube, the driver operates according to the environment information.

8. The LED light tube of claim 7, wherein the sensor detects an ambient light level, the driver adjusts an output light of the LED strip according to the ambient light level.

9. The LED light tube of claim 7, wherein the sensor detects a movement of an object, and the driver controls the light strip based on whether the movement exists.

10. The LED light tube of claim 1, wherein the attached device has a battery providing a battery power to the driver to drive the LED strip.

11. The LED light tube of claim 10, wherein the battery provides the driver to drive the LED strip to emit light when the LED light tube apparatus is removed from a normal bracket holder.

12. The LED light tube of claim 10, wherein an output light level of the LED strip is determined by an expected use time period.

13. The LED light tube of claim 1, wherein the attached device has a rotating ring wrapping the LED light tube apparatus, and rotatable manually relative to the LED light tube.

14. The LED light tube of claim 13, wherein a rotation angle of the rotating ring is provided to the driver to determine how to control the LED strip.

15. The LED light tube of claim 14, wherein the multiple LED modules of the LED strip has a first set and a second set of LED modules with different optical characteristics, the driver adjusts a relative driving current ratio to the first set of the multiple LED modules and the second set of the multiple LED modules to generate mixed output lights of different optical characteristics.

16. The LED light tube of claim 13, wherein the LED strip emits a light beam with a main direction, a rotating angle of the rotating ring controls the driver to change the main direction of the light beam.

17. The LED light tube of claim 16, wherein the rotating ring moves the LED strip to change the main direction of the light beam.

18. The LED light tube of claim 1, wherein the attached device uses a magnet unit to attach to the first end cap.

* * * * *